(12) United States Patent
Funabashi et al.

(10) Patent No.: US 7,948,210 B2
(45) Date of Patent: May 24, 2011

(54) BATTERY PACK AND ELECTRIC TOOL

(75) Inventors: Kazuhiko Funabashi, Hitachinaka (JP);
Nobuhiro Takano, Hitachinaka (JP);
Eiji Nakayama, Hitachinaka (JP);
Hiroyuki Hanawa, Hitachinaka (JP);
Atsushi Sumi, Hitachinaka (JP); Keita Saitou, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 691 days.

(21) Appl. No.: 12/050,966

(22) Filed: Mar. 19, 2008

(65) Prior Publication Data

US 2008/0252263 A1 Oct. 16, 2008

(30) Foreign Application Priority Data

Mar. 19, 2007 (JP) ................................. 2007-071642

(51) Int. Cl.
*H01M 10/46* (2006.01)

(52) U.S. Cl. ........................................ 320/112; 320/115
(58) Field of Classification Search .................. 320/107, 320/112, 114, 115, 132, 149, 150
See application file for complete search history.

(56) References Cited

FOREIGN PATENT DOCUMENTS

| JP | 06-141479 | 5/1994 |
|----|-----------|--------|
| JP | 2003-174720 | 6/2003 |
| JP | 2006-121827 | 5/2006 |

*Primary Examiner* — Edward Tso
(74) *Attorney, Agent, or Firm* — Antonelli, Terry, Stout & Kraus, LLP.

(57) ABSTRACT

A battery pack includes a plurality of lithium battery cells, an analog thermo sensing member, and an analog switch. The analog thermo sensing member detects, in an analog form, a battery temperature of at least one of the plurality of lithium battery cells, and outputs an output preventing signal if the battery temperature is over a first predetermined temperature. The analog switch element is the plurality of lithium battery cells in series, and is switched, based on the output preventing signal, to a state in which a current is prevented from flowing in the plurality of lithium battery cells.

10 Claims, 4 Drawing Sheets

BATTERY PACK AND ELECTRIC TOOL

BACKGROUND OF THE INVENTION

1. Field of the Invention

The present invention relates to a battery pack and an electric tool.

2. Description of Related Art

In a cordless electric tool, a battery as a power supply is further required to be high in capacity and reduced in weight. To cope with this, a lithium battery whose output density is high is being expected, and is gradually employed recently.

On the other hand, when the overcharge, overdischarge, overcurrent occurs in a lithium battery, there is raised a fear of ignition in the worst case due to degradation of battery or temperature rise of battery. Accordingly, Japanese Patent Application Publication No. 06-141479 discloses a battery charger includes a protection circuit for observing the overcharge, overdischarge, overcurrent of respective cells in a battery pack. In this battery charger, if the battery voltage of the respective battery cells is lower or higher than a predetermined voltage value, and a current flowing through the battery cells is larger than a predetermined current, the protection circuit outputs a detection signal to shut off charge and discharge paths. In this way, a countermeasure for the safety, that is, preventing the overvoltage, overdischarge, overcurrent is performed.

SUMMARY OF THE INVENTION

As a cordless electric tool, there are various tools such as a driver drill tool that makes a hole in a lumber or a steel plate or fastens a screw, and a circular saw tool that cuts off a lumber. In order to make a motor operate powerfully, a lithium battery pack for a cordless electric tool is required to supply a large current. In such a case, the temperature of the battery rises. The excessive heat generation causes a failure of the battery, and furthermore, may cause a fuming smoking and ignition. Therefore, it is demanded to prevent the overvoltage, overdischarge, overcurrent without fault.

In view of the above-described drawbacks, it is an objective of the present invention to provide a lithium battery pack which is inexpensive and is safe and secure.

In order to attain the above and other objects, the present invention provides a battery pack connectable to at least one of an electric tool having a first tool terminal and a second tool terminal and a battery charger having a first charger terminal and a second charger terminal. The battery pack includes a first battery terminal, a second battery terminal, a plurality of lithium battery cells, an analog thermo sensing member, and an analog switch element. The first battery terminal is selectively connectable to one of the first tool terminal and the first charger terminal. The second battery terminal is connectable to corresponding one of the second tool terminal and the second charger terminal. The plurality of lithium battery cells is connected between the first battery terminal and the second battery terminal. Each lithium battery cell has a positive terminal and a negative terminal. The analog thermo sensing member detects, in an analog form, a battery temperature of at least one of the plurality of lithium battery cells, and outputs an output preventing signal if the battery temperature is over a first predetermined temperature. The analog switch element is connected between the first battery terminal and the second battery terminal and in series with the plurality of lithium battery cells, and switched, based on the output preventing signal, to a state in which a current is prevented from flowing in the plurality of lithium battery cells.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

A battery pack according to a first embodiment will be described while referring to FIGS. 1 and 2.

Figure 1:
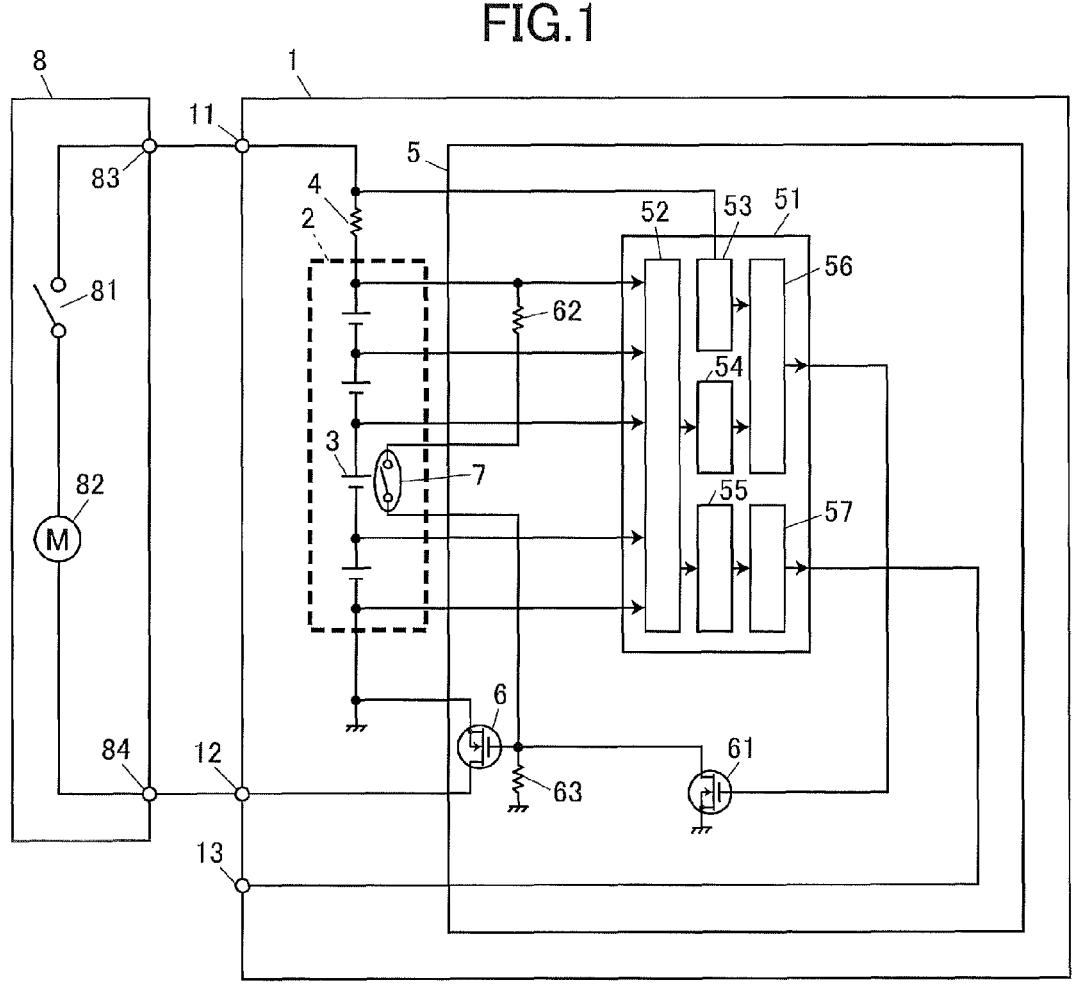
FIG. 1 is a block diagram of a lithium battery pack according to a first embodiment of the present invention.

FIG. 1 shows a block diagram of a lithium battery pack 1 (referred to as battery pack 1 briefly, hereinafter) according to a first embodiment of the present invention. The battery pack 1 can be connected to a cordless electric tool 8 (referred to as tool 8 briefly, hereinafter). The tool 8 includes a trigger switch 81, a motor 82, a positive terminal 83, and a negative terminal 84. The trigger switch 81 and the motor 82 are connected between the positive terminal 83 and the negative terminal 84 in series.

The battery pack 1 includes a positive terminal 11 connectable to the positive terminal 83 of the cordless electric tool 8, a negative terminal 12 connectable to the negative terminal 84 of the tool 8, a battery set 2 connected between the positive terminal 11 and the negative terminal 12 and having four lithium battery cells 3 (referred to as battery cells 3 briefly, hereinafter) connected in series, a current detection resistor 4 connected to the battery cells 3 in series for detecting the current flowing in the battery cells 3 based on a voltage developed across the current detection resistor 4, a protection circuit 5, a charging prohibition signal terminal 13 pulled out from the protection circuit 5.

The protection circuit 5 includes a protection IC 51, a switch element 6 connected to the battery set 2 in series, a switch element 61 connected between the protection IC 51 and the switch element 6, resistors 62 and 63 connected to the battery set 2 in parallel, and a thermosensor 7 connected between the resistors 62 and 63 and close contact with the battery cell 3 sandwiched between another battery cells 3. In the present embodiment, the switch elements 6 and 61 are NchFETs. Specifically, a gate of the switch element 61 is connected to the IC 51 and a source of the switch element 61 is connected to a gate of the switch element 6. A source of the switch element 6 is connected to the battery set 2 and a drain of the switch element 6 is connected to the negative terminal 12.

The protection IC 51 includes a battery voltage detection unit 52 for detecting a battery voltage of each battery cell 3, an overcurrent determination unit 53 for determining whether or not the current flowing in the battery cells 3 has exceeded a predetermined current, an overdischarge determination unit 54 for determining, based on the battery voltage detected by the battery voltage detection unit 52, whether or not the battery voltage of each battery cell 3 has dropped below a first predetermined voltage, an overvoltage determination unit 55 for determining whether or not the battery voltage of each battery cell 3 has exceeded a second predetermined voltage, an overdischarge/overcurrent signal output unit 56 for outputting results determined by the overcurrent determination unit 53 and the overdischarge determination unit 54, and an overvoltage signal output unit 57 for outputting result determined by the overvoltage determination unit 55.

Next, the operation of the protection IC 51 will be described.

The battery voltage detection unit 52 constantly detects the battery voltage of each battery cell 3, and the overdischarge determination unit 54 determines whether or not the battery voltage detected by the battery voltage detection unit 52 has dropped below the first predetermined voltage (2.0 V in the present embodiment). If the battery voltage of each battery cell 3 has dropped below the first predetermined voltage, the overdischarge determination unit 54 outputs an overdischarge signal (high signal: H) from the overdischarge/overcurrent signal output unit 56 to the switch element 61, and the switch element 61 is turned on by the H signal. When the switch element 61 is turned on, the switch element 6 is turned off. Therefore, the output from the battery pack 1 is shut off.

When the remaining capacity is reduced with discharging of the battery pack 1, an excessive dropping of the voltage causing failure or degradation of the battery cells 3 can occur. However, the above described construction prevents the battery pack 1 from being overdischarged.

Further, the overvoltage determination unit 55 determines whether or not the battery voltage detected by the battery voltage detection unit 52 has exceeded the second predetermined voltage (4.3 V in the present embodiment). If the battery voltage of each battery cell 3 has exceeded the second predetermined voltage, the overvoltage determination unit 55 outputs a charging prohibition signal (high signal: H) from the overvoltage signal output unit 57 to the charging prohibition signal terminal 13.

When the battery cells 3 are overcharged, a failure or degradation of the battery cells 3 can occur. However, if a battery charger for charging the battery pack 1 has a terminal connectable to the charging prohibition signal terminal 13 to halt the charging, the above described construction prevents the battery pack 1 from being overcharged.

Furthermore, the overcurrent determination unit 53 constantly determines whether or not the current detected by the current detection resistor 4 has exceeded a predetermined current. If the current has exceeded the predetermined current, the overcurrent determination unit 53 outputs an overcurrent signal (high signal: H) from the overdischarge/overcurrent signal output unit 56 to the switch element 61, and the switch element 61 is turned on by the H signal. When the switch element 61 is turned on, the switch element 6 is turned off. Therefore, an excessive current causing a failure or degradation of the battery cells 3 is prevented from flowing in the battery cells 3.

Next, the operation of the thermosensor 7 will be described while referring to FIG. 2. In FIG. 2, a condition in which the voltage of each battery cell 3 is in a range between the first predetermined voltage and the second predetermined voltage, and the current flowing the battery set 2 is equal to or lower than the predetermined current is assumed.

The thermosensor 7 is a thermal protector of the bimetal system or a thermostat in the present embodiment. The thermosensor 7 is connected between the resistors 62 and 63 in parallel with the battery set 2 and close contact with any one of the battery cells 3. The thermosensor 7 detects a temperature of the battery cell 3 and is opened when the temperature has exceeded a predetermined temperature.

Figure 2:
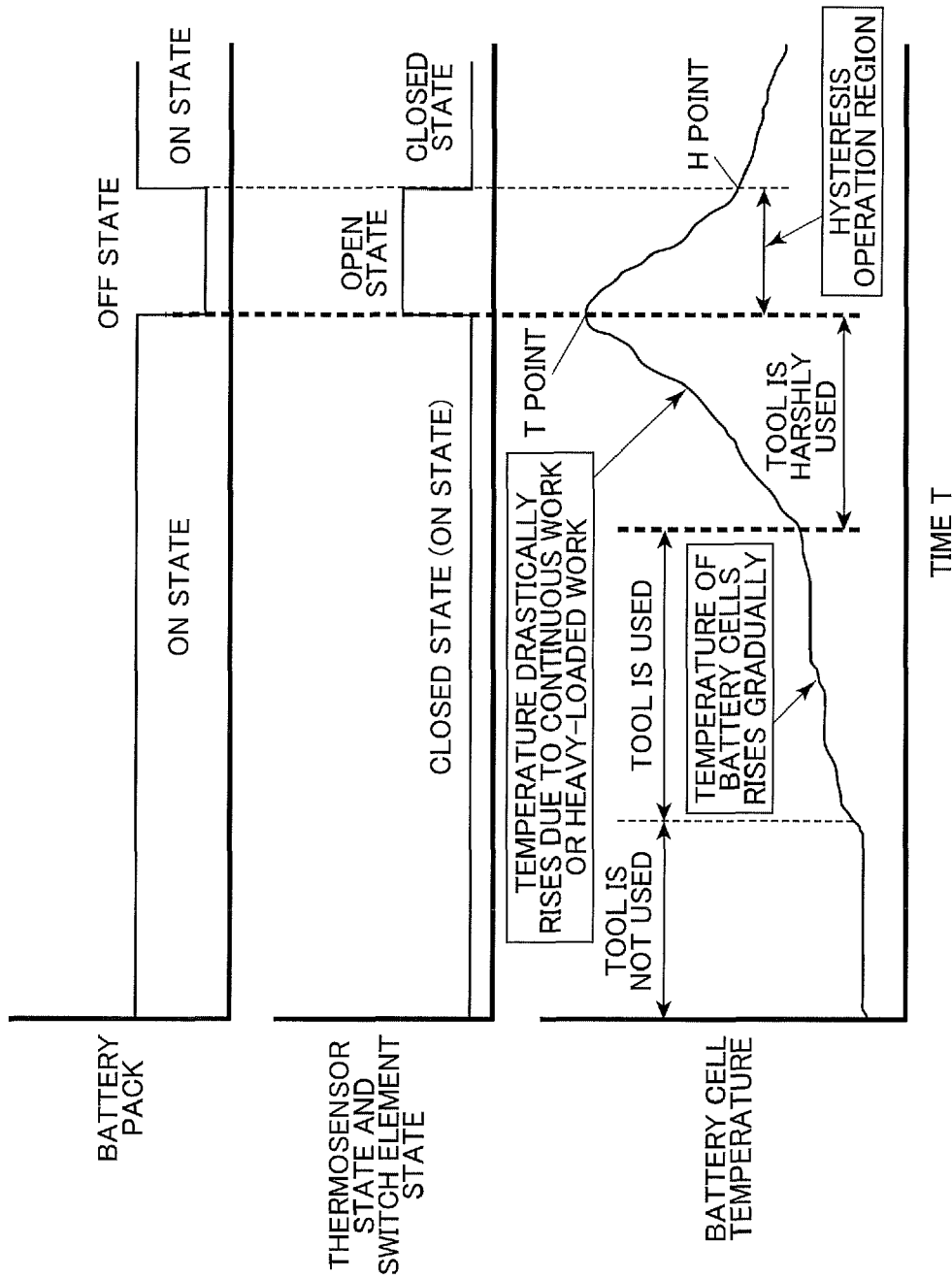
FIG. 2 is an explanatory diagram of an operation of a thermosensor.

As shown in FIG. 2, in an ordinary temperature, the thermosensor 7 is closed (ON state). Therefore, a battery voltage of the battery cells 3 is applied to the gate of the switch element 6 to turn on the switch element 6. When the trigger switch 81 is closed, the voltage of the battery cells 3 is applied to the tool 8.

As the tool 8 is continually used, the temperature of the battery cells 3 rises gradually. Especially, when the tool 8 is harshly used due to continuous work or heavy-loaded work, the temperature of the battery cells 3 rapidly rises. Then, when the temperature of the battery cells 3 has reached the predetermined temperature (T point in FIG. 2), the thermosensor 7 is opened. When the thermosensor 7 is opened, a potential of the gate of the switch element 6 become 0 V. Thus, the switch element 6 is turned off (open state) to shut off the output from the battery pack 1. Since the output from the battery pack 1 is halted temporarily, the temperature of the battery pack 1 is prevented from becoming high extremely. Accordingly, degrading and breaking down of the battery cells 3 are prevented. Thus, a lightweight, safe, and inexpensive lithium battery pack 1 can be provided.

However, even if the switch element 6 is turned off, the switch element 6 will be turned on again if the temperature of the battery cells 3 drops below the predetermined temperature. Then, if the switch element 6 is immediately turned on again, the temperature of the battery cells 3 reaches the predetermined temperature, causing the switch element turning off.

Therefore, the thermosensor 7 in the present embodiment has a hysteresis, as shown in FIG. 2. Due to the hysteresis, the thermosensor 7 is not turned on until the temperature of the battery cells 3 has dropped below a hysteresis temperature (H point in FIG. 2) even if the temperature of the battery cells 3 has dropped below the predetermined temperature (T point). Thus, the off state of the thermosensor 7 is kept during a predetermined period that is required for dropping the temperature of the battery cells 3.

Next, a lithium battery pack 1 according to a second embodiment will be described while referring to FIG. 3.

Figure 3:
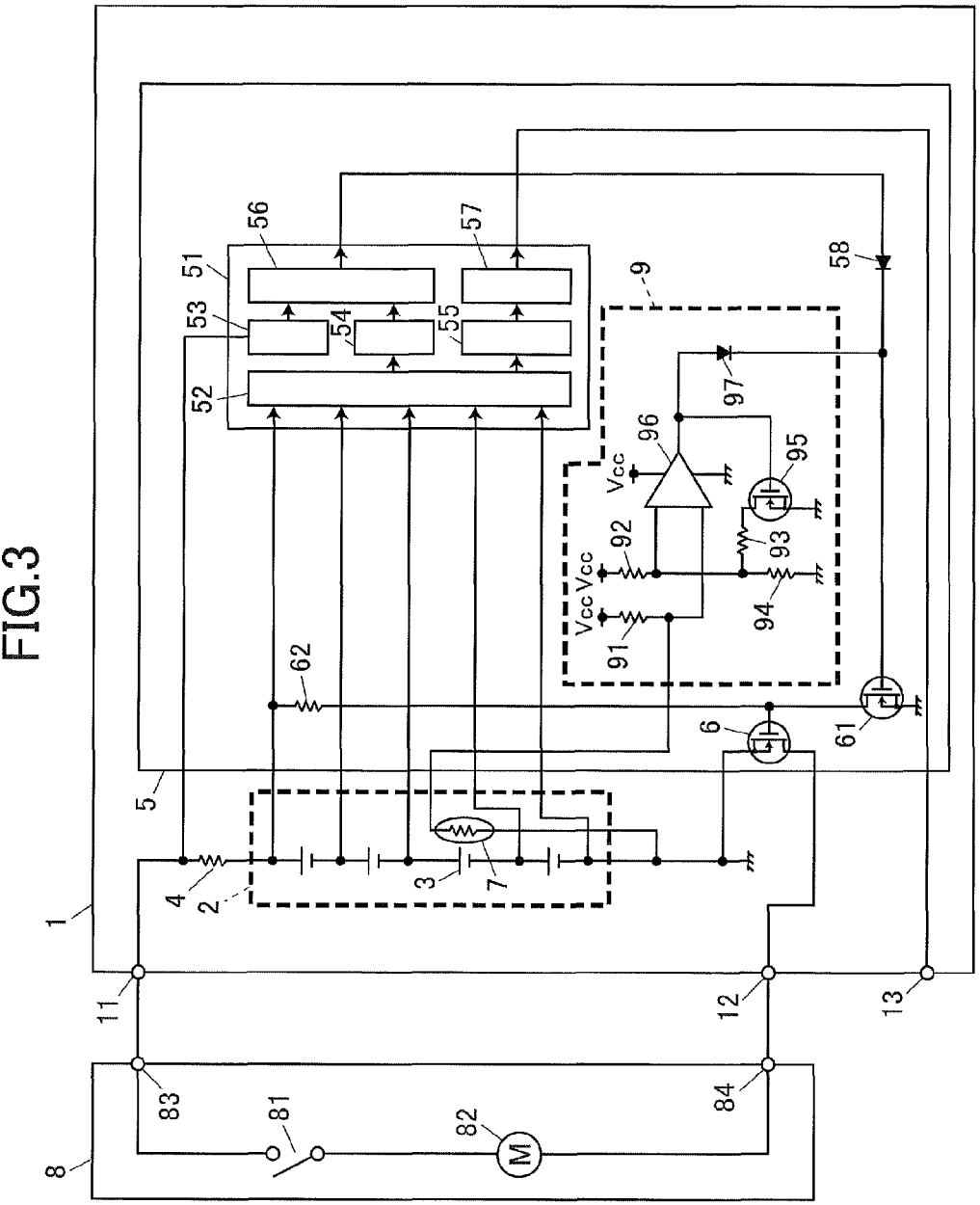
FIG. 3 is a block diagram of a lithium battery pack according to a second embodiment of the present invention.

As shown in FIG. 3, a thermistor whose resistance value changes in response to changing of the temperature of the battery cells 3 is used as the thermosensor 7 in the present embodiment, while the thermal protector of the bimetal system or the thermostat is used as the thermosensor 7 in the first embodiment.

The thermosensor 7 in the second embodiment is in close contact with the battery cells 3 similar to the thermosensor 7 in the first embodiment. The lithium battery pack 1 further includes a temperature output unit 9 connected to the thermosensor 7. The temperature output unit 9 is provided with resistors 91-94, a switch element 95, a comparator 96 and a diode 97.

A voltage supplied from a power supply Vcc is divided by the resistor 91 and the thermosensor 7, and the divided voltage is inputted into the comparator 96 as a battery temperature voltage. On the other, the voltage supplied from the power supply Vcc is also divided by the resistors 92 and 94, and the divided voltage is also inputted into the comparator 96 as a reference voltage. The comparator 96 compares the battery temperature voltage with the reference voltage, and outputs a H signal to the gate of the switch element 61 through the diode 97 if the battery temperature voltage is larger than the reference voltage. The switch element 61 is turned on (ON state) in response to the H signal. When the switch element 61 is turned on, the switch element 6 is turned off (OFF state). Thus, the output from the battery pack 1 is shut off.

Further, the comparator 96 outputs the H signal to a gate of the switch element 95 if the battery temperature voltage is larger than the reference voltage. A source of the switch element 95 is connected to the resistor 93 connected to the resistor 92 in parallel with the resistor 94. When the switch element 95 receives the H signal, the resistors 93 and 94 are connected in parallel. When the resistors 93 and 94 are connected in parallel, the reference voltage is lowered. When the reference voltage is lowered, the comparator 96 outputs the H signal until the temperature of the battery cells 3 drops for a predetermined temperature. Thus, the temperature output unit 9 has a hysteresis characteristic.

As described above, while the thermistor can be used as the thermosensor, it is preferable to use the thermal protector of the bimetal system or thermostat as described in the first embodiment due to following advantages.

If the thermistor is used as the thermosensor, the temperature output unit 9 as shown in FIG. 3 is required. However, if the thermal protector or thermostat is used as the thermosensor, the circuit configuration can be significantly simplified since the thermal protector or thermostat can be directly connected to the input unit of the switch element 6.

Further, the temperature output unit 9 as shown in FIG. 3 requires the power supply Vcc. Thus, the current flowing the battery cells 3 is increased. However, when the thermal protector of the bimetal system or thermostat that detects the temperature by the bimetal system that is, mechanical operation is used as the thermosensor as shown in FIG. 1, the current flowing the battery cells is not increased since the battery pack 1 is provided with the temperature output unit 9. Accordingly, the protection circuit 5 can saves energy.

Even in the case where the switch element 6 is provided on not the battery pack 1 but the cordless electric tool 8, it is more preferable to use the thermal protector or thermostat than to use the thermistor.

While the invention has been described in detail with reference to the specific embodiment thereof, it would be apparent to those skilled in the art that various changes and modifications may be made therein without departing from the spirit of the invention.

Figure 4:
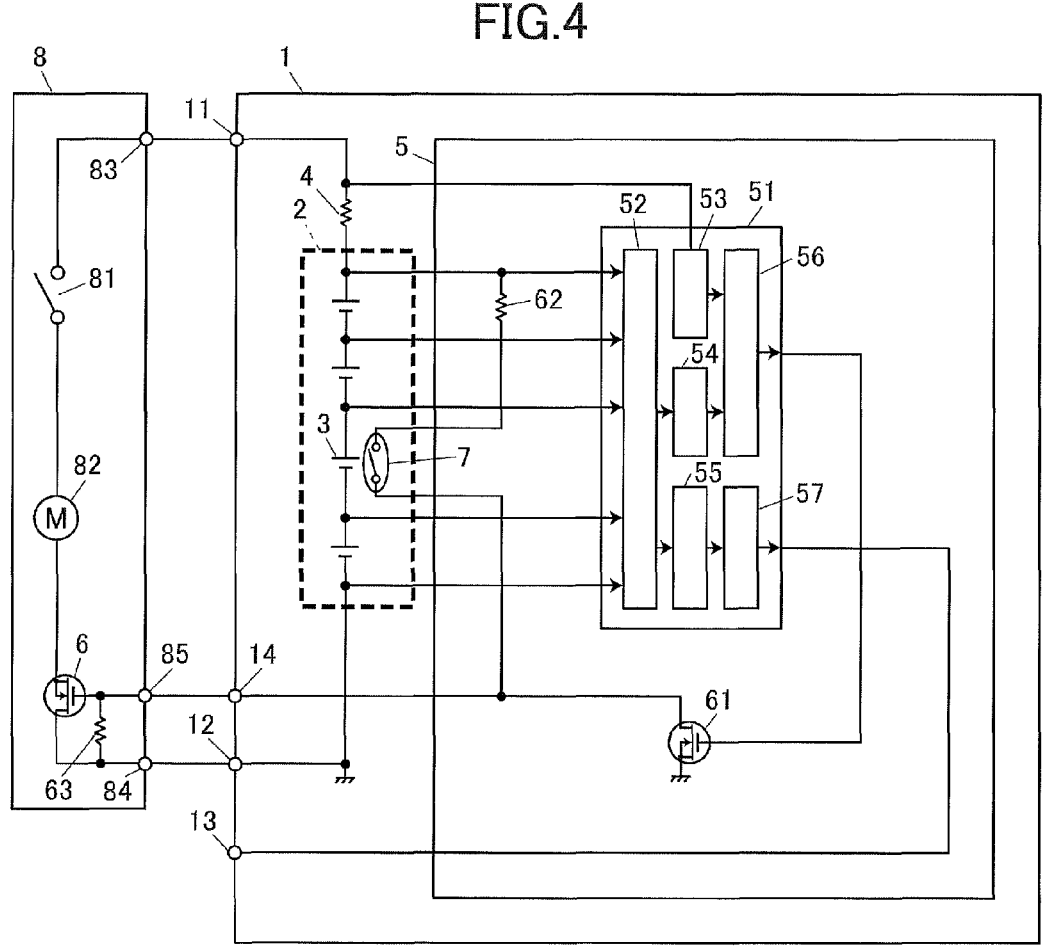
FIG. 4 is a block diagram of a lithium battery pack according to a modification of the present invention.

For example, as shown in FIG. 4, the switch element 6 may be provided on not the battery pack 1, but the tool 8. Further, the switch elements 6 and 61 may be another analog switch while NchFET is used the switch elements 6 and 61 in the preferred embodiment.

What is claimed is:

1. A battery pack connectable to at least one of an electric tool having a first tool terminal and a second tool terminal and a battery charger having a first charger terminal and a second charger terminal comprising:
    a first battery terminal selectively connectable to one of the first tool terminal and the first charger terminal;
    a second battery terminal connectable to corresponding one of the second tool terminal and the second charger terminal;
    a plurality of lithium battery cells connected between the first battery terminal and the second battery terminal, each lithium battery cell having a positive terminal and a negative terminal;
    an analog thermo sensing member that detects, in an analog form, a battery temperature of at least one of the plurality of lithium battery cells, and outputs an output preventing signal if the battery temperature is over a first predetermined temperature; and
    an analog switch element connected between the first battery terminal and the second battery terminal and in series with the plurality of lithium battery cells, and switched, based on the output preventing signal, to a state in which a current is prevented from flowing in the plurality of lithium battery cells.

2. The battery pack according to claim 1, wherein the plurality of lithium battery cells includes a first cell, a second cell, and a third cell sandwiched between the first cell and the second cell, the analog thermo sensing member being in contact with the third cell.

3. The battery pack according to claim 1, wherein the analog thermo sensing member continues to output the output preventing signal until the battery temperature has dropped below a second predetermined temperature lower than the first predetermined temperature.

4. The battery pack according to claim 1, wherein the thermo sensing member is a thermal protector.

5. The battery pack according to claim 1, wherein the thermo sensing member is a thermostat.

6. The battery pack according to claim 1, further comprising:
    a cell voltage detection unit configured to detect a cell voltage between the positive terminal and the negative terminal of at least one of the lithium battery cells;
    a digital protection unit configured to determine, based on the cell voltage, whether or not flowing a current in the plurality of lithium battery cells is possible, and configured to output the output preventing signal if flowing the current in the plurality of lithium battery cells is possible.

7. The battery pack according to claim 6, wherein the digital protection unit outputs the output preventing signal if the cell voltage is below a first predetermined voltage when the first battery terminal and the second battery terminal are connected to the first tool terminal and the second tool terminal respectively.

8. The battery pack according to claim 6, further comprising an output voltage detection unit configured to detect an output voltage outputted from the plurality of lithium battery cells and applied the electric tool when the first battery terminal and the second battery terminal are connected to the first tool terminal and the second tool terminal respectively, wherein the digital protection unit outputs the output halting signal if the output voltage is over a second voltage.

9. The battery pack according to claim 6, wherein the digital protection unit is powered by the plurality of lithium battery cells.

10. An electric tool comprising:
    a battery pack including:
        a first battery terminal;
        a second battery terminal;
        a plurality of lithium battery cells connected between the first battery terminal and the second battery terminal; and
        an analog thermo sensing member that detects a battery temperature of at least one of the plurality of lithium battery cells, and outputs the output preventing signal if the battery temperature is over a first predetermined temperature,
    a first tool terminal connectable to the first battery terminal;
    a second tool terminal connectable to the second battery terminal; and
    an analog switch element connected between the first tool terminal and the second tool terminal and in serried with the plurality of lithium battery cells and switched, based on the output preventing signal, to a state in which a current is prevented from flowing in the plurality of lithium battery cells.

* * * * *